Nov. 10, 1942. C. D. GARRETSON 2,301,207
METHOD OF MAKING RUBBER HOSE
Original Filed Jan. 14, 1936
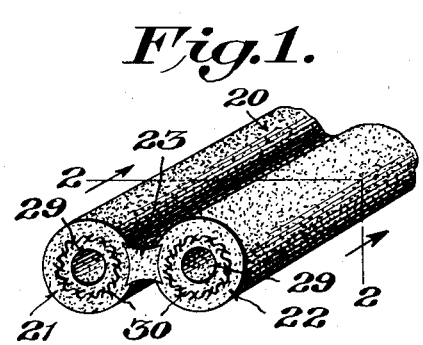
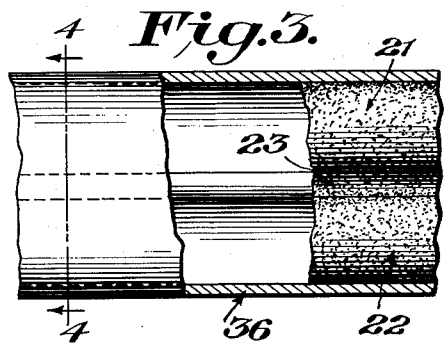
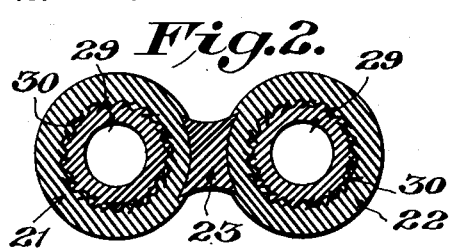
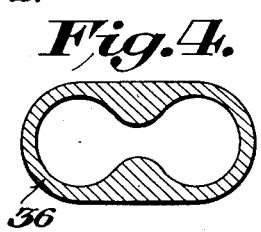
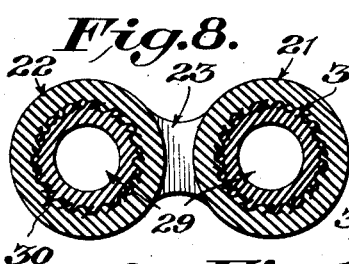
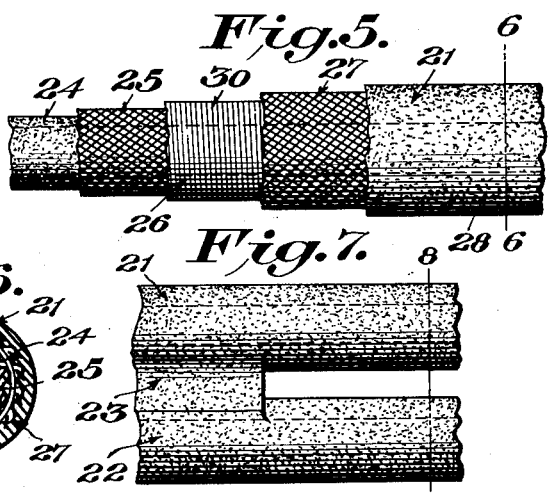
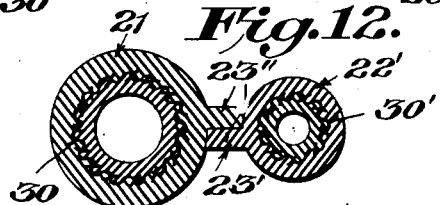
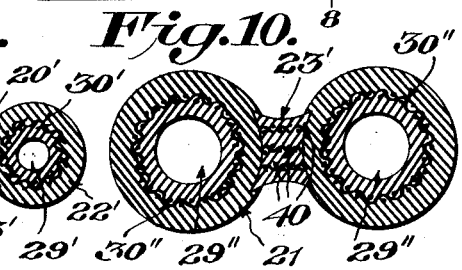
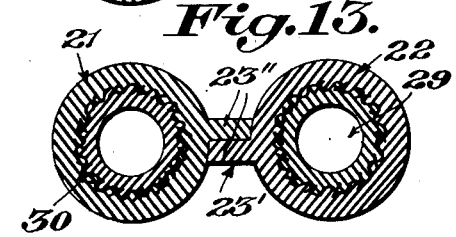
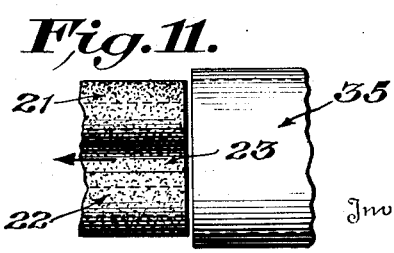
Inventor
Cornelius D. Garretson,
By Albert T. St Clair
Attorney Patented Nov. 10, 1942

2,301,207

UNITED STATES PATENT OFFICE 2,301,207

METHOD OF MAKING RUBBER HOSE

Cornelius D. Garretson, Wilmington, Del., assignor to Electric Hose & Rubber Company, Wilmington, Del., a corporation of Delaware Original applications January 14, 1936, Serial No. 59,137, and October 25, 1938, Serial No. 236,955. Divided and this application August 14, 1940, Serial No. 352,546

6 Claims. (Cl. 154—8)

This invention relates to the art of rubber hose, and more particularly to an improved method of making it.

The present application is a division of my co-pending applications, Serial No. 59,137, filed January 14, 1936, now abandoned, and Serial No. 236,955, filed October 25, 1938, which became Patent No. 2,236,171, on March 25, 1941.

Rubber hose is made for a variety of purposes, including the transmission of water, air and various other fluids, as well as mobile solids, and is often required to withstand exceedingly heavy internal pressures, as in the case of oxy-acetylene hose, pressure greasing hose, and high pressure air hose.

When previous types of hose have been subjected to high pressures, these products have had a tendency to become distorted, the character of the distortion depending on the manner in which the hose was made.

For instance, ordinary hose containing layers of fabric between layers of rubber tends to expand transversely and hence become shorter longitudinally when the layers of fabric have the thread braided in a overlapping diagonal relation, whereas hose which is wound more or less transversely tends to lengthen and, therefore, have a reduced diameter when the fluid passing through it exerts a substantial pressure against its internal wall.

This result is particularly annoying when the decrease in length between fixed connections tends to rupture same, or where it pulls a free end of the hose up to an inconvenient height. This condition becomes aggravated when it is desired to use a double hose, and especially if pressure in the adjacent parallel hose members is unequal.

I have discovered that the distortion can be eliminated if a substantially transverse winding is interposed between two layers of crisscross diagonal braiding, as these windings may be balanced to compensate for the expansion and contraction referred to above, thus producing the desired result of constant diameter and constant length.

I have also discovered that it is possible to make a practical integral double hose, and that such a hose can be made resistant to deformation, even when unequal pressures are being used in parallel channels, by employing the improved winding referred to.

It is therefore an object of this invention to provide an integral multiple channel hose and a method of making same.

It is also an object to provide an integral multiple channel hose with free connections at both ends.

It is a further object to make an integral multiple channel hose which is capable of carrying different pressures in its various channels without distortion.

It is another object to make an integral multiple channel hose in which the external and internal diameters of the various hose sections are unequal.

It is a further object to provide a method of making an integral multiple channel hose with the aid of a lead press.

It is finally an object to provide a method of making an integral multiple channel hose from two preformed hose sections in such a way that the channels of the hose sections are spaced apart by an amount greater than the thickness of the walls of the individual hose members.

With the above and other objects in view which will be apparent as the description proceeds, I have set forth my invention in the following specification and illustrated it in the accompanying drawing in which:

Figure 1 is a perspective view of an improved double hose unit;

Fig. 2 is a transverse section on the line 2—2 of Fig. 1;

Fig. 3 is a plan of a lead mold cut away to show a piece of rubber hose therein;

Fig. 4 is a transverse section on the line 4—4 of Fig. 3;

Fig. 5 is a plan view of a single type rubber hose with cut away portions to disclose the construction;

Fig. 6 is a transverse section on the line 6—6 of Fig. 5;

Fig. 7 is a plan view of the type of hose shown in Fig. 1, with a portion of the intermediate web removed;

Fig. 8 is a transverse section on the line 8—8 of Fig. 7;

Fig. 9 is a transverse section through a modified double hose formed of two sizes of hose;

Fig. 10 is a transverse section through double hose containing a wire webbing instead of a cotton webbing;

Fig. 11 is a plan view of two pieces of hose corresponding to Figs. 5 and 6 arranged on either side of a preformed piece of solid rubber preparatory to feeding them into the dies which give them the preliminary form of the desired integral member, such as that shown in Fig. 1;

Fig. 12 is a transverse section through two pieces of preformed hose of modified construction preparatory to uniting same; and Fig. 13 is a transverse section through two pieces of preformed hose similar to the construction shown in Fig. 12, except that the two preformed hose sections are of equal diameter.

Referring to the accompanying drawing, and particularly to Figs. 1, 2, 5, and 11, my improved hose may comprise an integral double hose 20 made of preformed single hose members 21 and 22 and a preformed solid rubber strip 23 of substantially four-cusped hypocycloidal cross-section.

Members 21 and 22 are preferably of similar construction, which is shown in detail with respect to member 21 in Figs. 5 and 6, and each have a channel 29 therethrough.

As indicated therein, hose member 21 comprises an internal rubber core 24 provided with a layer of diagonally braided cotton fabric 25, a layer of transversely wound cotton thread 26 superposed thereon, a layer of diagonally braided cotton fabric 27 formed therearound, and an outer cover of rubber 28.

The layers of cotton fabric 25, 26, and 27 collectively form the reinforcements 30 for the hose members 21 and 22. The layers of cotton fabric 25, 26, and 27 are separated by rubber cement or intervening layers of rubber (not shown) in the usual way where desired.

Having formed the hose members 21 and 22 in the usual way by extruding the rubber core 24 through suitable dies, braiding a layer of fabric 25 therearound, applying a layer of rubber cement or rubber thereto, winding this with a transverse winding 26, applying an additional layer of rubber cement or rubber thereto, braiding another coating of cotton fabric 27 therearound, and providing this with a rubber cover 28, these members 21 and 22 are assembled on either side of the preformed rubber strip 23 as shown in Fig. 11. They are then ready for feeding into a die 35, shown diagrammatically in Fig. 11, which compresses them together and gives them a preliminary form of the desired unitary member.

Of course, the imparting of this preliminary form may be done in any well-known way, as by passing the preformed members through pressure rolls (not shown).

As the thus formed unitary member leaves the die 35, a lead mold 36, shown in Figs. 3 and 4, is formed in situ therearound in the way commonly employed in the manufacture of single hose. In this operation, the assembled preformed members are fed into a lead press, where they pass through a male die that is arranged in proximity to a female die in such a way that the lead surrounds the assembled preformed members as they emerge from the male die and pass into the female die, thus forming the lead mold shown in Figs. 3 and 4.

The thus encased unitary member 20 is then vulcanized as usual, after which the mold is cut away, leaving the finished integral multiple channel hose 20.

As shown in Figs. 7 and 8, it is a particular feature of my invention that the construction described and illustrated permits the easy removal of a portion of the intermediate web 23 wherever desired in order to permit of coupling the component hose members 21 and 22 to any desired object, as the terminals of an acetylene torch (not shown). The desired portion of the intermediate web 23 is easily removed without damaging the hose members 21 and 22, by cutting or grinding, thus facilitating the cutting of the hose members 21 and 22 to any desired relative lengths, and permitting their separate attachment to any desired object.

This easy method of attachment would not be possible were the unitary hose member made as a solid member (not shown) by uniting two preformed tubular members directly to one another, and encasing these two members in a single superposed rubber coating, either with or without the addition of further cotton reinforcing around both of the preformed members, although this latter method of forming an integral multiple channel hose is within the purview of the broader aspects of my invention.

As shown in Fig. 9, my invention may be made in the form of a unitary multiple channel hose 20' comprising preformed rubber hose members 21 and 22' of different external and/or internal diameters, having channels 29 and 29', respectively, therethrough, and an intermediate preformed web member 23'. As illustrated therein, members 21 and 22' are preferably provided with reinforcements 30, 30', respectively, corresponding to the reinforcement 30 shown in Figs. 5 and 6. The webbing 23' is thicker at one side than at the other in order to step down the diameter from the larger hose member 21 to the smaller hose member 22' with the maximum of added strength consistent with minimum weight.

This modification of my invention is preferably made in the same way as described above for the multiple channel hose 20.

As shown in Fig. 10, the cotton fabric reinforcement 30 and/or 30' in either the single or multiple channel hose may be replaced by a similar reinforcement 30" in which the cotton thread is replaced by steel wire. In some cases it may be desirable to use a cotton reinforcement in one hose member and a wire reinforcement in the other hose member. This form of my invention is provided with channels 29".

As also illustrated in Fig. 10, the web 23 in any of the embodiments of my invention may be provided with additional reinforcing 40 of cotton or wire fabric.

In Fig. 12, I have shown a further modification of my invention in which the hose members 21 and 22' are preformed with cooperating flanges 23". When these hose members are assembled as shown in Fig. 12 and subjected to the pressure of a die 35, or of pressure rolls (not shown), and the subsequent vulcanization, the flanges 23" become integrally united to form the web 23'. This permits the production of my improved tubing from two instead of three preformed members.

The form of my invention shown in Fig. 1 may be made similarly, as shown in Fig. 13. Here the hose members 21 and 22, of equal size, and provided with the channels 29, are also provided with cooperating flanges 23" which are integrally united to form the web 23' in the manner explained above.

In the manufacture of all forms of my invention, the tubing is prevented from collapsing during the vulcanizing operation in any conventional manner, as by the use of fluid pressure in channels 29, 29', or 29", or by the use of removable mandrels (not shown) therein. In case the latter are used, they are, of course, removed after the vulcanizing operation is completed.

Where it is desired to impart any special configuration to the exterior of the finished hose, such as corrugations, this is done by making the dies used in the lead press with the desired configuration in order that this can be imparted to the finished hose by the time the vulcanizing operation is completed.

It will be apparent that the shape of the intermediate web 23 or 23' and the fillet between the web and the adjacent portions of the periphery of the hose members 21 and 22 or 22' may be varied as desired. Similarly, the hose members 21, 22 or 22' may be made the same color or of different colors, as by making hose member 21 red and hose member 22 green.

Although I have used the term "hose" herein in referring to my invention and one of its component parts, I wish it to be understood to mean both "hose" and "tubing" as these terms are used in the art.

It will be readily understood that, although I have shown only single and double channel hose herein, multiple channel hose containing a greater number of channels may be made in a similar manner where desired.

It will also be apparent that, although I have shown three layers of reinforcement in Figs. 5 and 6, the number of these reinforcing layers may be reduced where expansion, contraction, strength and durability are not important, and may be increased where added strength and durability are desired.

My multiple channel hose is adapted for a wide range of uses, as examples of which I may mention acetylene torches, paint sprays and grease and air hose, in which the two materials used are introduced into the two channels of the double hose member and are simultaneously conveyed to the acetylene torch, paint spray or grease gun, and there subjected to the desired intermingling. In acetylene torches, for example, one channel is usually for oxygen of about 50 pounds pressure per square inch, whereas acetylene is introduced into the other channel at pressures up to about 300 pounds per square inch.

My preferred multiple hose illustrated herein is adapted to withstand pressures, for example, up to 2,000 pounds per square inch where desired, and does not show any substantial deformation, even when one channel contains a fluid which is under exceedingly high pressure and the other channel contains a low pressure fluid.

My improved multiple hose, disclosed herein, has been subjected to continued flexing operations and repeated abrasion tests, as well as to oppositely directed stresses tending to separate the members 21 and 22, and has successfully stood up when these tests have been made exceedingly severe.

The cotton fabric reinforcements 25, 26 and 27 and the wire reinforcements 30'' may be made single single, single double, double double or any other desired winding without departing from the spirit of my invention, and the rubber compound used may be any suitable formulation of crude rubber, crude and reclaimed rubber, neoprene or mixtures of neoprene and crude and/or reclaimed rubber.

It will, therefore, be apparent that I have developed new and improved types of single and multiple hose, and methods of making same, that are highly resistant to distortion in use, and highly efficient in transmitting a single fluid or a plurality of fluids to a desired destination.

As many apparently widely different embodiments of this invention may be made without departing from the spirit thereof, it is to be understood that I do not limit myself to the foregoing embodiments or description except as indicated in the following claims.

I claim:

1. The method of making an integral multiple channel hose which comprises forming a plurality of rubber hose members, one of which members is provided with a flange extending longitudinally along one side, assembling said hose members with the free side of the flange arranged in contact with a side of the other preformed member, feeding these members while so assembled simultaneously into a lead press, forming a lead mold therearound, vulcanizing, and removing the lead mold.

2. The method of making an integral multiple channel hose which comprises forming a plurality of rubber hose members, one of which members is provided with a substantially flat flange extending longitudinally along one side, assembling said hose members with the free side of the flanged member arranged in contact with a side of the other preformed member, feeding these members while so assembled simultaneously into a lead press, forming a lead mold therearound, vulcanizing, and removing the lead mold.

3. The method of making an integral multiple channel hose which comprises forming a plurality of rubber hose members with a substantially flat flange extending longitudinally along one side of each hose member, assembling said hose members with said flanges arranged in overlapping contact, feeding these members while so assembled simultaneously into a lead press, forming a lead mold therearound, vulcanizing, and removing the lead mold.

4. The method of making an integral multiple channel hose which comprises forming a plurality of rubber hose members and a rubber spacing strip, assembling said rubber hose members in parallel relation on either side of and in contact with the preformed strip, feeding these members while so assembled simultaneously into a lead press, forming a lead mold therearound, vulcanizing, and removing the lead mold.

5. The method of making an integral multiple channel hose which comprises forming a plurality of rubber hose members and a rubber strip of hypocycloidal cross-section, assembling said rubber hose members in parallel relation on either side of and in contact with the preformed strip, feeding these members while so assembled simultaneously into a lead press, forming a lead mold therearound, vulcanizing, and removing the lead mold.

6. The method of making an integral multiple channel hose which comprises forming a plurality of rubber hose members, each of which is made by making a rubber core, sheathing this with a plurality of layers of diagonal braiding with a substantially transversely wound layer interposed therebetween and forming a rubber cover therearound, and a rubber spacing strip, assembling said rubber hose members in parallel relation on either side of and in contact with the preformed strip, feeding these members while so assembled simultaneously into a lead press, forming a lead mold therearound, vulcanizing, and removing the lead mold.

CORNELIUS D. GARRETSON.